Jan. 28, 1964  W. B. ERNST  3,119,375
LAYING CAGES
Filed May 28, 1962

INVENTOR.
WILLIAM B. ERNST
BY John P. Chandler
HIS ATTORNEY.

3,119,375
LAYING CAGES
William B. Ernst, 540 13th St. NE., Owatonna, Minn.
Filed May 28, 1962, Ser. No. 198,244
2 Claims. (Cl. 119—48)

This invention relates to laying cages for poultry and has for its principal object the provision of improved egg collecting means combined with a novel feeding arrangement.

Endless belt conveyors are widely used for the purpose of collecting eggs which as soon as they are laid roll over inclined lower walls of the cages onto the conveyor. It is a common practice to place a feeding trough and the conveyor, one above the other, in an aisle located between two rows of cages, where the chickens can eat out of only one side of the feed trough. With this arrangement, the conveyor is inaccessible unless the cages are dismantled. It has been the experience of most commercial poultry operators that these conveyors frequently break down and by the time operation has been restored the eggs have begun to deteriorate because of failure to deliver them to a cooler as quickly as should be.

It is an important object of the present invention to provide an improved laying cage structure embodying four rows of cages and wherein the eggs are accessible for collection at all times, whether the movable conveyor is operating or not. The structure is such that the floors of the cages in the first two rows slope downwardly towards one longitudinal front wall on the outside of the cage unit and the floors of the cages in the third and fourth rows slope oppositely towards the other front longitudinal wall.

Each of these front walls may comprise an upper section of conventional wire screen, an intermediate imperforate section, usually formed of sheet metal, and a lower section made from flexible material whose lower edge is unsecured to permit eggs to pass under this edge and onto an elongated horizontal trough or shelf which may, if desired, have a belt conveyor. While the lower edge of the lower flexible section is unsecured it is sufficiently shallow to prevent escape of the chickens.

The eggs from the inner row of cages thus pass over the floor sections of the outer row of cages and the eggs from both rows pass onto the shelf which is accessible to the operator. If a conveyor is not used, or if it is not in working order, the eggs can be quickly gathered by hand and until they are gathered the imperforate front wall section prevents the chickens in the front rows from destroying the eggs on the shelf.

Figure 1:
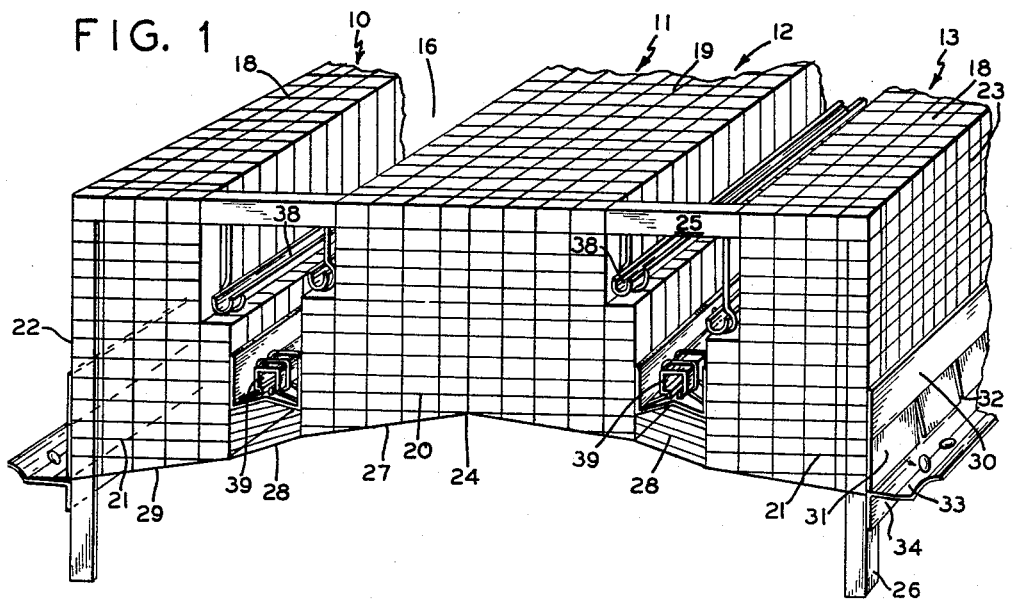
FIG. 1 is a broken perspective view of a laying cage structure embodying the present invention.

Referring now to FIG. 1, there are four rows of cages 10, 11, 12 and 13 arranged in two pairs with the rows in each pair provided with an aisle 16 therebetween. The cages are made from the usual wire mesh and include top walls 18 for the first and fourth rows and a continuous top wall 19 for the second and third rows. Hinged doors (not shown) are incorporated into the top walls to permit the hens to be inserted into the cages. There is also provided a continuous end wall 20 for the cages in rows 11 and 12 and an end wall 21 for each of rows 10 and 13, and front walls 22 and 23 at the outside of rows 10 and 13, respectively. An intermediate longitudinal wall (not shown) runs through the center 24 between the cages in rows 11 and 12. The cages are supported by spaced transverse bars 25 which are supported at the upper ends of legs 26. One continuous lower wall extends on each side of the center 24 under the cages in rows 11 and 12 as shown at 27, through the area between rows 11 and 10, and 12 and 13, as shown at 28 and thence under the cages in 10 and 13, as shown at 29, and downwardly towards the opposed front walls 22 and 23 of the cage structure so that eggs which are laid in the inside cages as well as in the outside cages pass to the front walls of the structure.

The front walls 22 and 23 are alike in construction and include an upper section formed of wire mesh and an intermediate imperforate section 30 which may be made from sheet metal, and a lower section 31 formed from flexible material such as plastic or fabric and which may be secured by stapling to the sheet metal section. This lower section which is essentially a curtain element has slots 32 to permit the eggs to roll freely outwardly onto a continuous collection tray or trough 33 having a downwardly extending flange 34 secured to legs 26. In FIG. 1 no conveyor belt is shown in this trough although such a conveyor is shown at 36 in FIG. 2.

There is also shown at 38 a watering trough for each row of cages and a special feeding arrangement 39 for each pair of rows, which however, forms the subject of another application. It will be noted that the walls 35 and 37 facing the aisle, which has the watering trough and the feeding arrangement, terminate at their lower ends at a point sufficiently above intermediate wall 28 to permit the eggs from the floor 27 of the inner row to pass through these unobstructed areas and onto the downwardly inclined lower wall or floor 29 and thence onto the trough.

It will be seen from the foregoing that the eggs from the cages in both rows 12 and 13 are deposited in the single trough which generally facilitates collection of eggs if a conveyor should break down. The slope of these lower walls need not be to great but it is preferred to have the wall sections between rows 12 and 10, and 13 and 11, somewhat greater than in the cage walls themselves.

Figure 2:
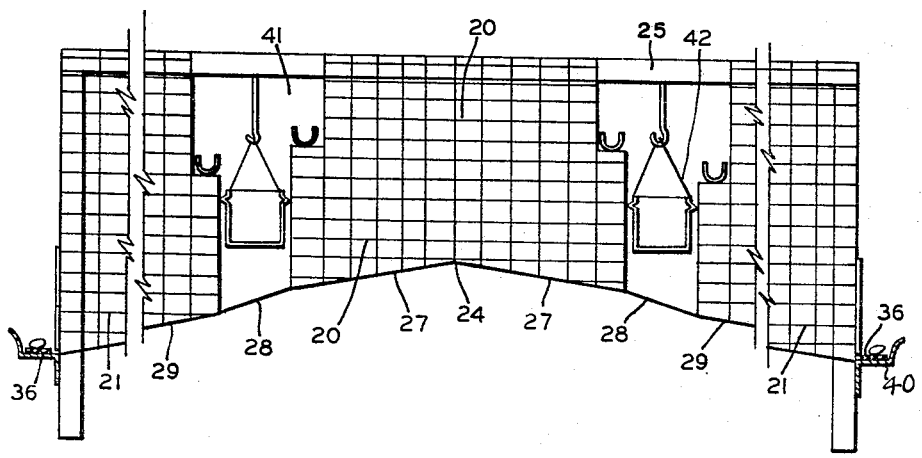
FIG. 2 is a broken end elevation showing a slightly modified arrangement.

The arrangement of FIG. 2 differs primarily from that of FIG. 1 in that the conveyor belt 36 is present in trough 40 and the aisles between the two rows in each pair have a different feeding arrangement shown at 42. In this fashion the eggs from the inside rows 11 and 12 gain an increased speed as they enter the lower walls 29 of the cages in outside rows 10 and 13. This speed of rolling travel reduces the incidence of the chickens in these outside rows destroying the eggs.

While there have been described herein what are at present considered preferred embodiments of the invention, it will be obvious to those skilled in the art that many modifications and changes may be made therein without departing from the essence of the invention. It is, therefore, to be understood that the exemplary embodiments are illustrative and not restrictive of the invention, the scope of which is defined in the appended claims, and that all modifications that come within the meaning and range of equivalency of the claims are intended to be included therein.

I claim:

1. A laying cage structure for poultry and comprising first and second parallel rows of individual cages, each having upper and lower walls and side walls, and having an aisle between the rows, and feeding and watering means in said aisle and accessible to the poultry in each row, a continuous egg trough extending along one outside longitudinal edge of the lower wall of the first row, a lower wall in the aisle connecting the lower walls in the first and second rows, said three lower walls forming a continuous incline downwardly to cause eggs in the first row to roll onto the trough and the eggs in the second row to roll across the lower wall in the aisle and across the lower wall in the first row and into the trough, the side walls facing the aisle and the side wall facing the trough having an unobstructed area above said lower walls to permit said rolling action of the eggs from both rows onto the trough.

2. A laying cage structure for poultry and comprising first and second parallel rows of individual cages, each having upper and lower walls and side walls, and having an aisle between the rows, and feeding and watering means in said aisle and accessible to the poultry in each row, the walls of the cages being formed from wire mesh except for the front longitudinal wall along the first row, said latter wall being formed with a wire mesh upper section, an imperforate intermediate section, and a flexible lower section, open at its lower end, a continuous egg trough extending along one outside longitudinal edge of the first row, a lower wall in the aisle connecting the lower walls in the first and second rows, said three lower walls forming a continuous incline downwardly to cause eggs in the first row to roll onto the trough and the eggs in the second row to roll across the lower wall in the aisle and across the lower wall in the first row and into the trough, the side walls facing the aisle having an unobstructed area above said lower walls to permit said rolling action of the eggs from both rows onto the trough.

References Cited in the file of this patent
UNITED STATES PATENTS

| | | |
|---|---|---|
| 2,335,173 | Corey | Nov. 23, 1943 |
| 2,501,475 | Muehlfeld | Mar. 21, 1950 |
| 2,756,721 | Hayes | July 31, 1956 |
| 2,956,539 | Boening | Oct. 18, 1960 |